(12) United States Patent
Hill et al.

(10) Patent No.: US 12,744,984 B2
(45) Date of Patent: Sep. 22, 2026

(54) CAMERA SYSTEM FOR USE IN HARSH ENVIRONMENTS WITH TUBULAR CASINGS FOR PROTECTING AND ALIGNING PARALLEL CAMERAS

(71) Applicant: Rovco Limited, Bristol (GB)

(72) Inventors: Lyndon Hill, Bristol (GB); Peter Batchelor, Bristol (GB)

(73) Assignee: ROSENXT HOLDING AG, Stans (CH)

( * ) Notice: Subject to any disclaimer, the term of this patent is extended or adjusted under 35 U.S.C. 154(b) by 0 days.

(21) Appl. No.: 19/068,942

(22) Filed: Mar. 3, 2025

(65) Prior Publication Data

US 2025/0287087 A1 Sep. 11, 2025

(30) Foreign Application Priority Data

Mar. 5, 2024 (EP) .................................... 24161595

(51) Int. Cl.
*H04N 23/54* (2023.01)
*H04N 23/51* (2023.01)

(52) U.S. Cl.
CPC ............. *H04N 23/54* (2023.01); *H04N 23/51* (2023.01)

(58) Field of Classification Search
CPC ...................................................... H04N 23/54
(Continued)

(56) References Cited

U.S. PATENT DOCUMENTS 10,638,024 B1 * 4/2020 Dresang ................. H04N 23/52
11,303,797 B1 * 4/2022 Phillips .................. G03B 17/08
(Continued)

FOREIGN PATENT DOCUMENTS

CN 114322777 A 4/2022
CN 218416531 U 1/2023
(Continued)

OTHER PUBLICATIONS

Combined Search and Examination Report mailed Apr. 18, 2024 for GB 2403204.7, filed Mar. 5, 2024 in 5 pages.
European Search Report mailed Aug. 6, 2024 for EP 24161595, filed Mar. 5, 2024 in 8 pages.
Supplementary Disclosures dated Apr. 17, 2024 for GB 2403204.7, "Underwater camera measurement and control system and method for immersed tube joint installation" in 4 pages.
(Continued)

*Primary Examiner* — Leron Beck
(74) *Attorney, Agent, or Firm* — Knobbe Martens Olson & Bear LLP

(57) ABSTRACT

A camera system (100) for imaging in harsh environments. The camera system comprises a body with a first tubular casing, a second tubular casing, and a longitudinal strut which couples the first tubular casing to the second tubular casing to rigidly maintain the first and second tubular casings in a parallel, side by side relationship. The first and second tubular casing both define a front aperture for providing access to their respective interior space. The camera system also comprises a camera mounting endcap arranged to be coupled to the body to seal both front apertures. The camera mounting endcap comprises at least two camera mounting formations for coupling cameras to the camera mounting endcap. The camera mounting endcap has a viewing port for each respective camera to allow each camera to view the harsh environment through a front aperture. The camera mounting formations are arranged to rigidly maintain the cameras in a parallel, side by side relationship.

17 Claims, 7 Drawing Sheets

(58) Field of Classification Search
USPC .......................................................... 348/47
See application file for complete search history.

(56) References Cited

U.S. PATENT DOCUMENTS 11,550,139 B2* 1/2023 Chen .................... H04N 23/53
12,072,207 B1* 8/2024 Fu .......................... G01C 3/04
2002/0154243 A1* 10/2002 Fife .................... H04N 23/617 348/E5.026
2003/0202118 A1* 10/2003 Hirunuma ............. H04N 23/55 348/E5.026
2004/0173609 A1* 9/2004 Duke .................... H04N 23/51 348/E5.026
2005/0201740 A1* 9/2005 Pakalns ................. G03B 17/08 348/82
2006/0274171 A1* 12/2006 Wang .................. H04N 25/133 348/E5.042
2007/0125915 A1* 6/2007 Hein ..................... F16M 11/28 248/161
2010/0066899 A1* 3/2010 Holmberg ........... H04N 23/531 348/375
2010/0261961 A1 10/2010 Scott et al.
2012/0098972 A1* 4/2012 Hansen ................. H04N 23/45 348/E5.09
2012/0140113 A1* 6/2012 Lin ....................... G03B 17/55 348/E5.026
2013/0136298 A1* 5/2013 Yu .......................... G06T 7/70 382/103
2013/0188036 A1* 7/2013 Kalfas ................... H04N 23/50 348/82
2014/0104479 A1* 4/2014 Samuels ................ H04N 23/51 348/335
2015/0049243 A1* 2/2015 Samuels ................ G03B 17/55 348/374
2015/0070574 A1* 3/2015 Koppetz ........... H05K 7/20145 348/373
2015/0124070 A1* 5/2015 Dutt ...................... H04N 23/51 348/78
2015/0317780 A1* 11/2015 Dumont ................ G01C 11/30 348/47
2016/0180534 A1* 6/2016 Emst ................... H04N 5/2628 348/294
2016/0227079 A1* 8/2016 Oh ........................ H04N 23/45
2016/0261829 A1* 9/2016 Olsson .................. G03B 17/08
2016/0307953 A1* 10/2016 Kono ................... H10F 39/804
2016/0350054 A1* 12/2016 Bluvband ............ G06F 3/0416
2017/0230548 A1* 8/2017 Costa .................... G03B 11/04
2018/0039162 A1* 2/2018 Ali ........................ G02B 7/028
2018/0227565 A9* 8/2018 Lin ..................... H04N 13/194
2019/0306966 A1* 10/2019 Byrne ................... G02B 7/028
2020/0007762 A1* 1/2020 Dallmeier ............. H04N 23/45
2020/0244877 A1* 7/2020 Zhou ..................... H04N 23/45
2020/0358931 A1* 11/2020 Jenkinson ............. G03B 17/08
2021/0176402 A1* 6/2021 Beringer ............... G06Q 50/01
2021/0235010 A1* 7/2021 Wallace ................ H04N 13/25
2022/0137490 A1* 5/2022 Lord ........................ A45F 4/00 396/419

FOREIGN PATENT DOCUMENTS

EP 3985431 A1 4/2022
GB 2570748 A 8/2019
GB 2581549 A 8/2020

OTHER PUBLICATIONS

Supplementary Disclosures dated Apr. 17, 2024 for GB 2403204.7, “Underwater camera with lighting function” in 3 pages.

* cited by examiner

CAMERA SYSTEM FOR USE IN HARSH ENVIRONMENTS WITH TUBULAR CASINGS FOR PROTECTING AND ALIGNING PARALLEL CAMERAS

The present application claims the benefit of priority to European Patent Application No. 24161595.4, filed Mar. 5, 2024, which is incorporated herein by reference in its entirety.

BACKGROUND

Known multi camera systems have a data processor that communicates with each camera to transfer image data (video or images) as well as perform processing tasks.

If the multi camera system is to produce high quality video, then the data processor must be powerful enough to transfer and process high bandwidth image data of large spatial and colour resolution, colour depth and high framerate. In some harsh environments, camera systems may also encounter problems with efficient heat dissipation from the camera and data processor (and associated components) to the environment.

The present inventors have devised an improved multi camera system for harsh environments that can exhibit one or more of the following advantages relative to known systems:

improved reliability;
increased simplicity;
reduced cost;
smaller in size; and/or
reduced weight.

SUMMARY

By way of a non-limiting overview, there is provided a camera system for imaging in harsh environments. The camera system comprises a body with a first tubular casing, a second tubular casing, and a longitudinal strut which couples the first tubular casing to the second tubular casing to rigidly maintain the first and second tubular casings in a parallel, side by side relationship. The first and second tubular casing both define a front aperture for providing access to their respective interior space. The camera system also comprises a camera mounting endcap arranged to be coupled to the body to seal both front apertures. The camera mounting endcap comprises at least two camera mounting formations for coupling cameras to the camera mounting endcap. The camera mounting endcap has a viewing port for each respective camera to allow each camera to view the harsh environment through a front aperture. The camera mounting formations are arranged to rigidly maintain the cameras in a parallel, side by side relationship.

In accordance with a first aspect of the invention, there is provided a camera system for imaging in harsh environments, the camera system comprising: a body, the body comprising: a first tubular casing defining front and rear ends, the front end of the first tubular casing defining a first front aperture for providing access to a first interior space; a second tubular casing defining front and rear ends, the front end of the second tubular casing defining a second front aperture for providing access to a second interior space; and a longitudinal strut which couples the first tubular casing to the second tubular casing to rigidly maintain the first and second tubular casings in a parallel, side by side relationship; a camera mounting endcap arranged to be coupled to the body to seal the first front aperture and the second front aperture, the camera mounting endcap comprising: a first camera mounting formation for coupling a first camera to the camera mounting endcap; a first viewing port for enabling the first camera to view the harsh environment through the first front aperture; and a second camera mounting formation for coupling a second camera to the camera mounting endcap; and a second viewing port for enabling the second camera to view the harsh environment through the second front aperture, wherein the first and second camera mounting formation being arranged to rigidly maintain the first and second cameras in a parallel, side by side relationship.

Beneficially, the combination of the longitudinal strut and the camera mounting formation results in the following advantages: maintaining a parallel alignment of the cameras in response to high pressures and temperatures; enhanced vibration and impact protection to cameras; reduces need for recalibration between the cameras (e.g., when cameras are in a stereoscopic arrangement); and cooling of the internal components of each tubular casing.

Optionally, the camera system further comprises a first camera mounted within the first interior space; a first data processor mounted within the first interior space.

Optionally, the camera system further comprises a first internal data link coupled between the first camera and the first data processor within the first interior space to transfer image data from the first camera to the first data processor.

Optionally, the camera system further comprises a second camera mounted within the second interior space. Optionally, the camera system further comprises a second data processor mounted within the second interior space.

Optionally, the camera system further comprises a second internal data link coupled between the second camera and the second data processor within the second interior space to transfer image data from the second camera to the second data processor.

Optionally, the camera system further comprises an external data link arranged to communicatively couple the first camera and/or the first data processor to the second camera and/or the second data processor, the external data link spanning between the first tubular casing and the second tubular casing.

The internal data links may be a super high bandwidth connection. The external data link enables each camera to be directly coupled to a data processor within the respective tubular casing. This enables rapid data transfer between the camera and data processor of each tubular casing, which enables the use of cameras with high resolution, colour depth and framerate. These properties respectively allow for fine detail, accurate colour and accurate motion capture, but together require higher bandwidth than would be possible in comparison to a notional system which has multiple cameras in respective casings each coupled to a common data processor, thus requiring the use of high bandwidth data links which extend between casings through the harsh subsea environment. Such super high bandwidth connections for harsh environments are unreliable, expensive and/or difficult to manufacture. Moreover, the camera and data processor pairs according to embodiments of the invention enable the above-mentioned level of image processing in real-time with less processing power in comparison to the notional system. A powerful data processor is undesirable due to its power requirements and the need to operate in a sealed enclosure where heat cannot easily be dissipated, thus resulting in data being transferred for post processing (i.e. offline processing) rather than processed in real-time. Specifically, the distinct processors coupled with the external data link are suitable for computer vision processing which results in high internal temperatures which the features of the first aspect overcome.

Each tubular casing may comprise a camera and a data processor, the camera may comprise an image sensor and a camera data processor (distinct from the first and second data processors). The camera data processor may be configured to process raw image data from the image sensor and convert it into a high-quality image, e.g., with simple image functions such as, transformations, demosaicing, noise reduction, and image sharpening. The camera data processor may not be suitable for computationally demanding image processing or computer vision algorithms, in contrast the data processor may be suitable for computationally demanding image processing and computer vision algorithms.

Optionally, the rear end of the first tubular casing defines a first rear aperture for providing access to the first interior space. Optionally, the rear end of the second tubular casing defines a second rear aperture for providing access to the second interior space. Optionally, the camera system further comprises a stabilising endcap arranged to be coupled to the body to seal the first rear aperture and the second rear aperture. Beneficially, the stabilising endcap resists twisting of the tubular casings to maintain parallel alignment of cameras in response to high pressures and temperatures.

Optionally, the stabilising endcap includes one or more integrated cable holes configured to house the external data link. Beneficially, due to the integrated cable holes in the stabilising endcap, the integrated cable is easy to seal between the two environments as the internal pressure of each environment is low.

Optionally, the external data link can be formed of optical fibre, copper twisted pair, or a combination of both.

Optionally, the stabilising endcap is integrally formed. Beneficially, this provides more robust control of the optics and further resists twisting of the camera system when operating in high pressure and/or temperature environments, or when external forces are acting.

Optionally, the camera mounting endcap may be formed from interlocking left and right parts. The left part may be configured to seal the first tubular casing, and the right part may be configured to seal the second tubular casing.

Optionally, the stabilising endcap further comprises fins on its external surface. Beneficially, these fins (or other patterned design) may increase the cooling performance of the camera system.

Optionally, the camera mounting endcap includes one or more integrated cable holes configured to house the external data link. Beneficially, this enables the integrated cable to be sealed between the two interior spaces without passing through the external environment and removes the need for specialised external data ports since the internal pressure of each interior spaces may be the same.

Optionally, the first and second tubular casings are tapered towards the first end. Beneficially, the tapered first and second tubular casings enable support of a range of stereo baselines. Beneficially, tapering of the first and second tubular casings may also reduce the weight of the system and increase enclosure strength when under high pressure (such as those experienced in subsea environments). Moreover, tapering of the first and second tubular casings may allow reduced viewing port area which may allow for a reduced thickness of the viewing port because larger viewing ports are required to be thicker when rated for the same pressure.

Optionally, the first and second tubular casings are tapered towards the first end such that the distance between the centre of the first and second viewing ports is arranged to be a predetermined stereo baseline between the first and second cameras. Optionally, the remainder of the first and second tubular casings (e.g., at a second end/rear end) can be larger (e.g., are not tapered) to accommodate the preferred data processor and other components.

Optionally, the first tubular casing, second tubular casing and strut are integrally formed. Beneficially, any heat generated internally to the tubular casings will be spread through the body (i.e., the first tubular casing, second tubular casing, and strut) reducing hot spots and the single integrally formed body removes the need for conductivity between parts when using sacrificial anodes. A body which is integrally formed may be defined as unitary in nature, monolithic, having no join lines, or made in the same mould, etc.

Optionally, the camera mounting endcap is configured to receive a material of the viewing port in respective first and second front apertures, and the camera mounting endcap is integrally formed. That is, the camera mounting endcap may be monolithic. Beneficially, this provides more robust control of the optics and further resists twisting when operating in high pressure and/or temperature environments, or when external forces are acting.

Optionally, the camera mounting endcap is configured to support the weight of the optical assembly of the first and second cameras. Beneficially, this allows the optical system to be modularised for assembly and testing.

Optionally, the camera system further comprises: an enclosure cover system arranged to cover the body. Optionally, the enclosure cover system comprises mounting points for coupling the enclosure cover system to a platform. Beneficially, the mounting points transfer mechanical stresses to the enclosure cover system such that the elements of the body (e.g., the first tubular casing, the second tubular casing, and the longitudinal strut) move together, avoiding stresses which may misalign cameras.

Optionally, the enclosure cover system further comprises ventilation slots. Beneficially, this allows heat to transfer into the external environment and keep the internals cool.

Optionally, the enclosure cover system further comprises one or more lens hoods for the first viewing port and/or the second viewing port. Beneficially, lens hoods reduce the amount of stray light entering the optical system of each camera.

Optionally, the platform comprises a vehicle.

Optionally, the camera system can comprise a subsea camera system for imaging in a subsea environment.

BRIEF DESCRIPTION OF THE DRAWINGS

By way of example only, certain embodiments of the invention will now be described by reference to the accompanying drawings, in which.

DETAILED DESCRIPTION

By way of a non-limiting overview, embodiments of the invention relate to harsh environment stereoscopic camera systems of a design and architecture suitable for a harsh environment and performing real-time (live) image processing. The stereoscopic camera system is formed from at least two camera pressure vessels coupled in parallel via a longitudinal strut to maintain a fixed distance between the camera pressure vessels. The camera of each camera pressure vessel is directly coupled to a single data processor within a respective casing via a super high bandwidth link. The stereoscopic camera system comprises a camera mounting endcap. The camera mounting endcap forms part of each camera pressure vessel and is also internally coupled to each camera to fix the camera sensor and optical assembly of the camera relative to the camera mounting endcap. The camera mounting endcap restricts twisting moments (torsion) in the stereoscopic camera system which may cause inaccuracies in the resultant stereo video/images. Thus, the camera mounting endcap also ensures that the cameras maintain a fixed stereo baseline and ensures that under high pressure or temperatures, any expansion or movement of the camera mounting endcap will be forced into a linear motion instead of rotary, keeping a parallel alignment of the optics assembly. The camera mounting endcap also provides an effective heatsink which provides internal cooling to each pressure vessel (this may improve the lifespan of internal computing components such as, SSD memory, or other semiconductor components). The use of multiple pressure vessels enables a harsh environment stereoscopic camera system that is smaller and/or simpler than known systems having the same quality of cameras and/or image data.

Figure 1A:
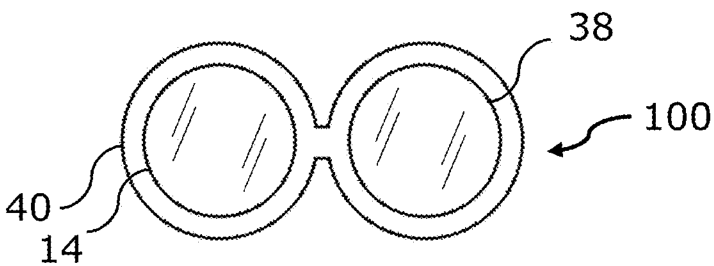
FIG. 1*a* is a front view of a camera system according to an embodiment of the invention, formed from two camera modules.
Figure 1B:
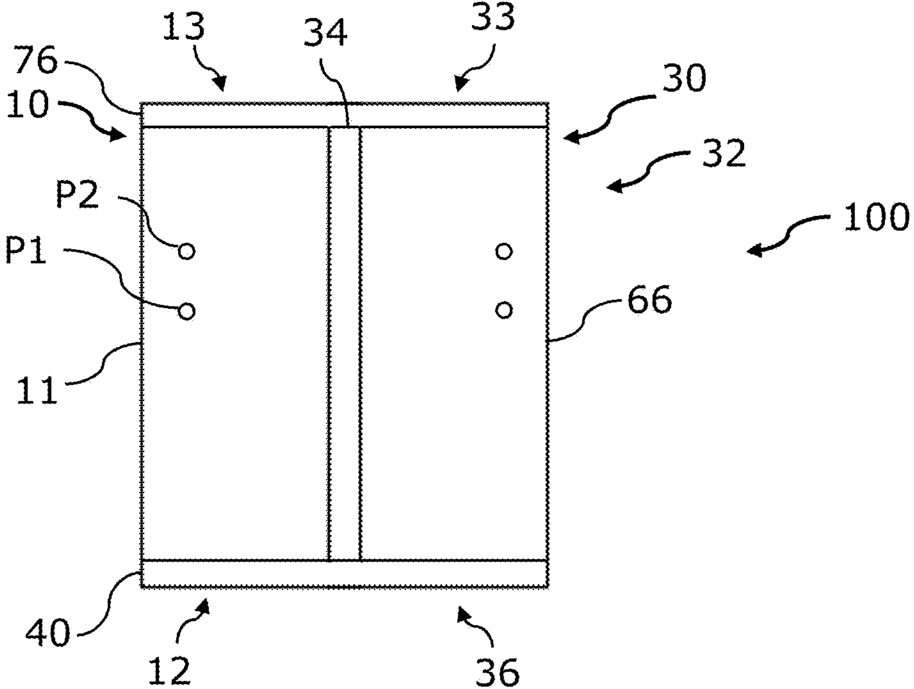
FIG. 1*b* is a top view of the camera system according to FIG. 1*a;*
Figure 1C:
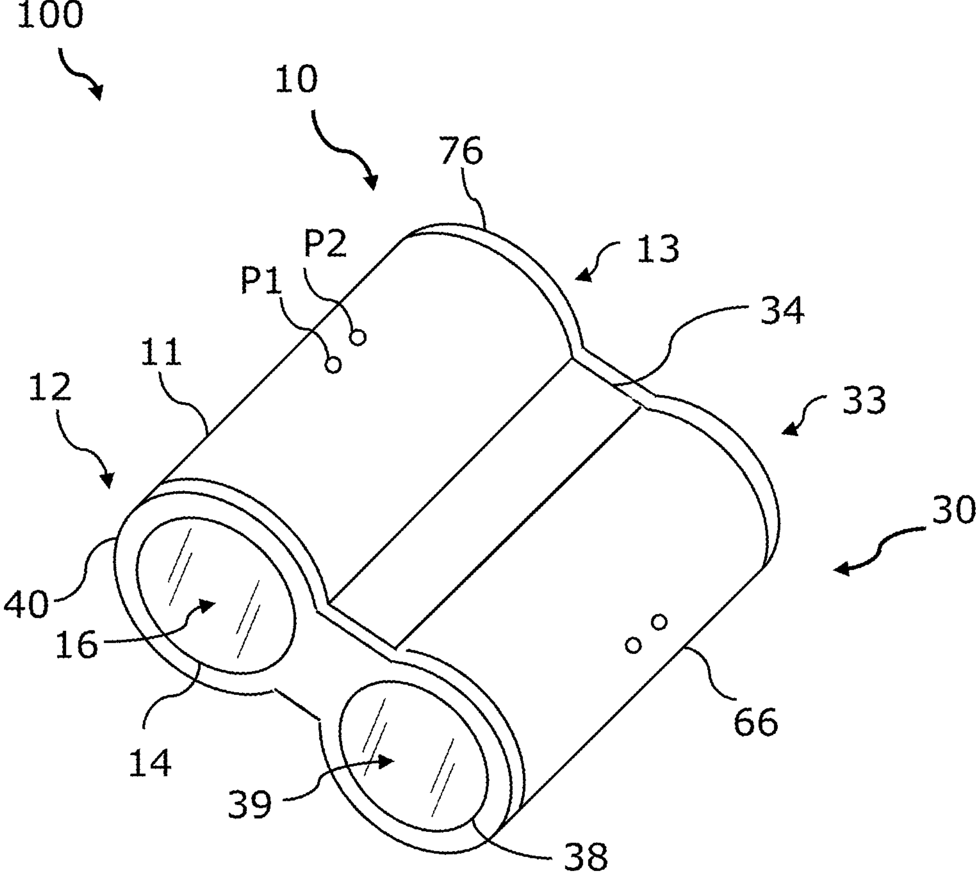
FIG. 1*c* is an isometric view of the camera system according to FIGS. 1*a* and 1*b;*

FIGS. 1*a*, 1*b*, and 1*c* show a camera system 100 for imaging in harsh environments. FIG. 1*a* shows a front view of the camera system 100. FIG. 1*b* shows a top view of the camera system 100. FIG. 1*c* shows an isometric view of the camera system 100.

The camera system 100 is arranged for deployment into harsh environments, such as continuous use underwater beyond two metres, subsea, or in the vacuum of space, on a Remotely Operated Vehicle (ROV), Autonomous Underwater Vehicle (AUV), robotic platform or the like.

Harsh environments place stringent requirements on a camera module, such as mechanical stresses, radiative stresses, chemical reactions and temperature exposure. Mechanical stresses can include pressure, shock, vibration, and coefficient of thermal expansion (CTE) mismatches. Radiative stresses can include cosmic rays, and magnetic influences from electromagnetism. Chemicals such as salt water, moisture, fuel and noxious gases can react with such a camera module. Temperatures below −40° C. and/or above 125° C. can also be experienced in a harsh environment.

The camera system 100 comprises a first camera module 10 and a second camera module 30 according to an embodiment of the invention. Features of the first camera module 10 are described below, however, the features discussed can apply equally to the second camera module 30.

In the illustrated embodiment the first camera module 10 comprises a tubular casing 11 that may define a watertight housing having an interior space. The tubular casing 11 defines a front end 12 and rear end 13. The front end 12 of the tubular casing 11 defines a first front aperture for providing access to an interior space 16. A camera (not shown) may be mounted within the interior space 16 and is arranged to capture images of the exterior environment through a viewing port 14 via the front aperture. The rear end 13 of the tubular casing 11 may define a rear aperture for providing access to the interior space 16 or may be formed integrally with the tubular casing 11. The interior space of the casing 11 can be accessed by removing a casing end cap which may be removably coupled to the tubular casing 11 via an o-ring sealed flange. An optional seal 13 may be provided to inhibit water ingress.

The tubular casing 11 of this embodiment is formed from high strength aluminium alloy and is cylindrical in shape so as to be structurally resistant to high pressures which may be experienced by the tubular casing 11 in an underwater harsh environment such as a deep underwater environment and/or a subsea oil and gas infrastructure site.

In other embodiments the material and/or shape of the tubular casing 11 can be changed depending on the deployment environment, e.g. stainless steel, copper beryllium, titanium, plastic, ionomers, PEKK, carbon fibre or ceramics in order to provide stress, chemical and/or temperature resistance. It is preferred that the material and shape of the tubular casing 11 results in a strong and rigid structure. The shape of the tubular casing 11 can be any pressure resistive shape such as a prism or cylinder. A camera can form part of the tubular casing 11 such that at least part of the camera (e.g. the lens of the camera) forms a fluid seal over the front aperture. Other end cap seals can be formed using methods including through-bolts or a threaded tube.

The tubular casing 11 can be arranged to protect the equipment within it from rapid accelerations and decelerations as may be experienced during operation in harsh environments. Thus, in an embodiment of the invention the inner structure is arranged to cradle the internal equipment in a secure manner; for example, interior surfaces of the tubular casing 11 can be provided with ribs or other mounting structures to which components of the equipment can be mounted. The interior space 16 can be provided with cushioning elements such as styrene polymer shielding elements that can conform to inner surfaces of the casing and outer surfaces of the components to cradle and protect them. Furthermore, the internal construction can be designed with heatsinks and fans to efficiently transfer excess heat into the casing and dissipate it externally.

The tubular casing 11 may comprise a plurality of ports, e.g., ports P1-P2, on the outside that enable wired connections to be made between internal equipment located in the interior space and equipment located outside of the tubular casing 11. In the illustrated embodiment there are two ports P1-P2 per tubular casing but in other embodiments there can be fewer or more ports and in some cases there are no ports.

Some or all of the ports P1-P2 can define harsh environment connectors arranged to connect the respective links to external links. The harsh environment connectors can be dry or wet mate, rubber moulded, glass reinforced or metal shell connectors. The connectors can be a type of keyed connector, plug and socket connector, or any other type of connector with or without a locking mechanism. In other embodiments the links pass through the port such that camera modules 10, 30 are connected by continuous cables.

The second camera module 30 is arranged to be identical in hardware to the camera module 10, however, can differ in software and/or firmware. Camera modules (e.g., 10) identical in hardware can be more flexible and adaptable; for example, either camera module could be replaced by a spare camera module.

The camera system 100 is formed of a body 32, the body 32 comprises the tubular casing 11 of the first camera module 10 (herein referred to as the first tubular casing 11), and a tubular casing 66 of the second camera module 30 (herein referred to as the second tubular casing 66), and a longitudinal strut 34. The first tubular casing 11 defines a front end 12 and a rear end 13. The second tubular casing 66 defines a front end 36 and a rear end 33. The front end 36 of the second tubular casing 66 defines a second front aperture for providing access to a second interior space 39. This body 32 may be formed of a single piece which reduces costs and aids in assembly. Heat generated internally to the tubular casings 11, 66 will be spread through the body reducing hot spots and the single piece body removes the need for conductivity between parts when using sacrificial anodes.

The longitudinal strut 34 is arranged to couple the first tubular casing 11 to the second tubular casing 66 to rigidly maintain the first and second tubular casings 11, 66 in a parallel, side by side relationship. The body 32 may be integrally formed or each part (e.g., first and second tubular casings 11, 66 and the longitudinal strut 34) may be welded together. Other ways of manufacturing the body 32 may be used alternatively or in addition to welding to couple the first tubular casing 11 and the second tubular casing 66 to the longitudinal strut 34. For example, each tubular casing 11, 66 may be manufactured with slots machined in the sides so that the longitudinal strut can act as a rail that the first and second tubular casings 11, 66 slide onto. This may increase the convenience of manufacturing and allow different sized rails to support different stereo baselines (by adjusting the distance between the tubular casings 11, 66). In another example, each tubular casing 11, 66 and the longitudinal strut 34 may be manufactured with corresponding U-shaped rails with holes in the side, such that two U-shaped rails interact and are secured with one or more bolts which pass through the holes. In another example, each tubular casing 11, 66 and the longitudinal strut 34 may be manufactured with corresponding U-shaped rails with protrusions/grooves along the length, such that one U-shaped rail slides into the corresponding grooves/protrusions on another corresponding U-shaped rail, such that two U-shaped rails interact and are secured using both the grooves/protrusions and a mechanism that locks it at one end when attached.

The camera system 100 further comprises a camera mounting endcap 40 arranged to be coupled to the body to seal the first front aperture and the second front aperture using first and second viewing ports 14, 38 respectively. The camera mounting endcap 40 is also arranged to be secured to cameras housed in respective tubular casings 11, 66. Beneficially, the combination of longitudinal strut 34 and camera mounting endcap 40 avoids a twisting of tubular casings 11, 66 to maintain parallel alignment of the cameras in response to high pressures and temperatures. This ensures that the arrangement between the cameras is stable which reduces the need for recalibration of the cameras in response to changes in pressure and/or temperature. Finally, the camera mounting endcap 40 may act as a heatsink for the cameras which may be used to dissipate heat from the cameras to the environment. The camera system 100 may further comprise a stabilising endcap 76 arranged to be coupled to the body 32 at the rear end 13, 33. The stabilising endcap 76 may comprise all of the features of the camera mounting endcap 40 and may act as a heatsink for the data processors which may be used to dissipate heat to the environment.

Advantageously, the use of multiple tubular casings with a single camera mounting endcap 40 and/or stabilising endcap 76 reduces the number of parts required for assembly, improves heat dispersion, and reduces conductive coupling required for protection by sacrificial anodes.

Figure 2:
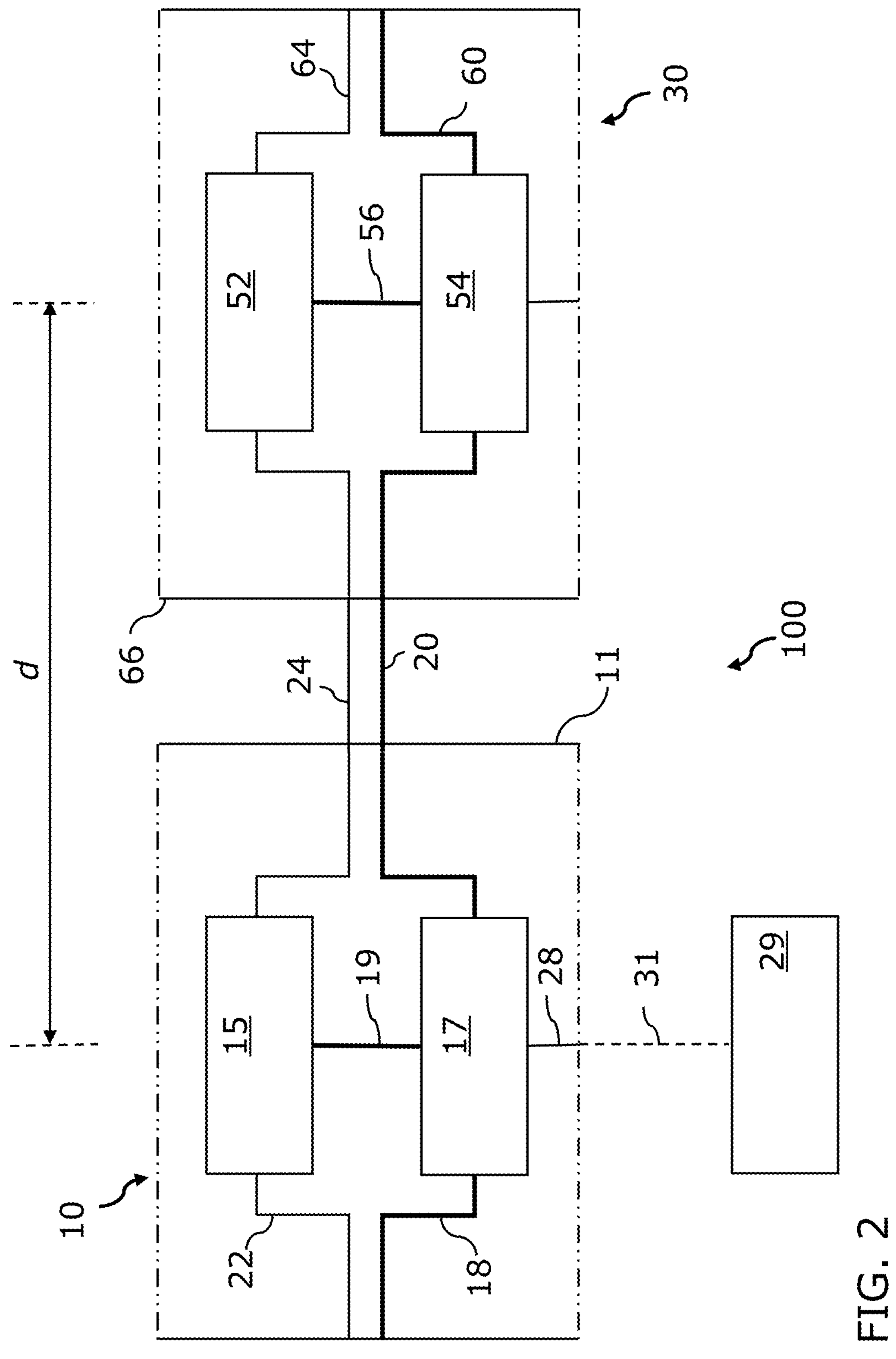
FIG. 2 is a system diagram of a multiple camera system according to an embodiment of the invention, formed from two camera modules in accordance with FIGS. 1*a* to 1*c;*

FIG. 2 is a diagram of a stereoscopic camera system 100 according to an embodiment of the invention which may be suitable for operating in harsh environments. The multi camera system 100 comprises the pair of camera modules 10, 30 (e.g., of FIGS. 1*a*-1*c*) arranged in a stereoscopic configuration. Features of the first camera module 10 are described below, however, the features discussed may also apply to the second camera module 30, as shown in FIG. 2.

The first camera module 10 illustrates the internal equipment. The camera module 10 comprises the camera 15, a data processor 17, a super high bandwidth internal data link 19 and an external data link which in this embodiment comprises high bandwidth first channels 18, 20, standard bandwidth second channels 22, 24 and a third channel 28, all housed within the interior space of the casing 11.

The camera 15 is arranged to enable high quality images/videos to be taken which can be used to map the environment outside of the camera module 10. The images and/or video can be used to identify objects and can be used for navigation. In this embodiment the camera 15 is an application specific camera, such as a FLIR Grasshopper 3™ arranged to capture high definition images and/or video. The camera 15 comprises an optical assembly (e.g., a lens system) (not shown), an image sensor (not shown), and an internal camera processor (not shown) to perform tasks such as setting camera parameters, synchronisation, file management, white balance and basic colour processing. Alternatively, the camera could be any other camera capable of capturing high definition images or video, for example, 1080P (1,920×1,080 pixels), 4K (3,840×2,160), 8K (8,192×4,320) or more at 20 frames per second (FPS) or higher.

The data processor 17 can have a processor (not shown), network interface (not shown), and volatile and non-volatile memory (not shown). The memory can store images, video, or metadata. The data processor 17 is distinct from the internal camera processor (not shown) of the camera 15.

The data processor 17 is configured to process images and/or video supplied to it from the camera 15 in real-time. Thus, the data processor 17 is sufficiently powerful to perform this function. The data processor 17 is configured in this embodiment to perform computationally demanding image processing and computer vision algorithms. For example, the data processor 17 can perform tasks on the frames and/or images produced by camera 15 such as feature detection, computing feature descriptors, matching features, rectifying the image, computing multiscale versions of the same image, or compressing and storing.

For real-time applications the data processor 17 is typically required to be synchronised to the frames of the camera 15. This leads to regular periods of time within which processing must take place. For example, for a 30 FPS camera, the data processor 17 will only have 33.3 ms to process the frame before the next frame is required to be processed. Moreover, higher quality images will take longer to process than lower quality images on the same data processor. For example, if processing cannot be achieved in the 33.3 ms for a 30 FPS camera, then the frame quality or FPS will have to be reduced. Thus, the useful output image/video quality of the camera 15 is limited by the processing power of the data processor 17. Thus, the data processor 17 has sufficient memory for caching multiple frames and enough power to perform non-trivial image processing operations.

In view of the above, camera modules according to an embodiment of the invention are arranged such that the camera 15 communicates with the data processor 17 via the super high bandwidth internal data link 19, for transferring captured images or videos from the camera 15 to the data processor 17. In the illustrated embodiment the internal data link 19 is USB 3 with a bandwidth of 5 Gigabits per second and the data processor comprises four ARM Cortex™ A57 64-bit cores and dedicated video encoding hardware. In other embodiments, the internal data link 19 can be any other high speed cable technology that meets the minimum bandwidth link requirements for a given application.

The high bandwidth first channels 18, 20 of the external data link can be provided to allow the data processor 17 to communicate and share data between other data processors (not shown). The first channels 18, 20 terminate at ports P1, P2 respectively. The first channels 18, 20 enable sharing of images or video frames and other processed data which do not require the same transfer speed as that provided by the super high bandwidth internal data link 19. In the illustrated embodiment the first channels 18, 20 are twisted pair with a bandwidth of 100 Megabits per second. In other embodiments the first channels 18, 20 can be any other high speed cable technology. In some embodiments the data processor 17 is not arranged to synchronise with data processors of other camera modules.

The camera 15 can be arranged to synchronise image capture with other cameras (not shown) via the standard bandwidth second channels 22, 24 of the external data link. The second channels 22, 24 terminate at ports P1, P2 respectively. In the illustrated embodiment the second channels 22, 24 are coaxial cables. The coaxial cables may have a bandwidth of two times the synchronisation frequency (for example, the bandwidth may be 30 Hz, if it is desired to synchronise the cameras at 15 Hz). Alternatively, the coaxial cables have a suitable bandwidth to synchronise cameras at a desired frame rate. The second channels 22, 24 can be used to synchronise other cameras (such as a camera 52 of the second camera module 30) to the camera 15 in real-time. Thus, the bandwidth of the second channels 22, 24 only needs to be specified to carry a simple but time stringent hardware synchronisation signal and exchange of timing metadata to ensure accurate matching of synchronised frames. In other embodiments the second channels 22, 24 can be any other high speed cable technology.

Processed data from the data processor 17 can be output via the third channel 28 of the external data link, which communicates with a first port P1. A transfer cable 31 can be coupled to the first port P1 in order to transfer data from the data processor 17 to an external computer client 29. The third channel 28 can be any type of bandwidth link. The external computer client 29 (e.g. data consumer) is an external computer which is external to the hardware of camera module 10. The external computer client 29 can perform additional processing, for example rendering alternative visualisations of the 3D data, or computing navigation data. In other embodiments the output link 28 can be a wireless communications link, or a bidirectional link allowing for camera system control by the external computer client.

In alternative embodiments, pairs of channels (e.g. 20, 24) can utilise separate and respective ports and in some cases all channels (e.g. 18, 20, 22, 24, and/or 28) can share a single port, or utilise separate and respective ports. In some cases, the channels between camera modules (e.g. 18, 20, 22, and/or 24) can pass via an integrated cable in an endcap thus avoiding the need for one or more ports, as will be discussed later.

The second camera module 30 is arranged to be identical in hardware to the camera module 10, however, can differ in software and/or firmware. Camera modules (e.g., 10) identical in hardware can be more flexible and adaptable; for example, either camera module could be replaced by a spare camera module.

The first and second camera modules 10, 30 are mounted on a platform (not shown) such as a rigid frame arranged to be removably coupled to an ROV or other vehicle or assembly. In some embodiments the camera modules can be arranged to be directly mounted on a vehicle. The camera modules can include mounting formations such as brackets which do not form part of the interior chamber arranged to facilitate mounting. In an embodiment described later with reference to FIG. 6, the camera modules may be covered in an enclosure cover system which may be used for mounting to a vehicle and/or platform.

The first and second camera modules 10, 30 are connected via the longitudinal strut 34. Therefore, the first and second camera modules 10, 30 are mounted in a known spatial relationship such that the lateral distance d between them is known. In this embodiment the lateral distance d between them is 15 cm. Alternatively, the camera modules 10, 30 can be any distance away from each other as long as the cameras 15, 52 observe an overlapping observation area to perform stereoscopically together. The optical axes of the first and second camera modules 10, 30 can be aligned in a parallel manner, but this does not need to be the case.

The software and/or firmware of the camera modules 10, 30 can be computationally optimised based on their position relative to each other. Thus, more accurate results can be obtained after modifying the relative position of the cameras without needing to modify the internal hardware of the system or open the enclosures.

The software and/or firmware of the camera modules 10, 30 can be arranged so that the system can be easily configured to work on specific applications. For example, if the (identical) cameras have different operating modes it is possible to change the configuration so that one camera in a stereo pair captures at one frame rate and the other captures images at a higher frame rate, thus allowing higher temporal resolution while simultaneously capturing stereo frame pairs.

The software and/or firmware of the camera modules 10, 30 can be arranged to allow for redundancy; for example, if one part of a camera module such as the data processor fails, the other camera module can take over the processing of the failed camera module. However, in this condition the system would not perform as well as a fully functioning system.

The stereoscopic configuration of FIG. 2 can be used for stereoscopic photogrammetry. When the working distance of a stereo camera system to the scene of interest increases it may be desirable to increase the camera separation to preserve voxel resolution. For systems with both cameras in a single enclosure the required separation could easily make the size of the enclosure inconveniently large, therefore requiring thicker walls, as the cylinder volume is dependent on the square of the radius.

In addition to the benefit of rapid data transfer speeds enabling high video quality due to the cameras 15, 52 each having a dedicated data processor 17, 54 coupled via a super high bandwidth connector 19, 56, harsh environment multi camera systems according to embodiments of the invention have a further advantage in that the casing size of each of the camera modules 10, 30 is independent of the distance d between cameras 15, 52. The inventors have found that it can be difficult to provide a super high bandwidth link across a harsh environment space between a pair of camera modules. Thus, if a pair of spaced cameras are to be coupled to a common data processor then the casing would have to be large enough to accommodate the separation between the cameras. By providing camera modules with dedicated camera and data processor pairs coupled via super high bandwidth internal data links, the casing walls can be made thinner than would be possible when compared to a single casing that is large enough to house both cameras with the same lateral distance d between them. Typically, larger casings require thicker walls to maintain rigidity and resist external high pressure. Thus, smaller casings can require less wall material, resulting in a cheaper and lighter casing. Moreover, a further benefit of harsh environment multi camera systems according to embodiments is that there can be less wasted or dead space when compared to a single large casing.

In FIG. 2, the identical camera modules 10, 30 can be arranged in a master-slave configuration, such that camera 15 and data processor 17 are programmed (via software and/or firmware) to be the master camera and master data processor respectively without requiring physical changes. Thus, the data processor 17 or camera 15 is arranged to act as synchronisation subsystem arranged to synchronise a system clock of the data processor 17 or the camera 15 to system clocks of one or more further distinct camera modules, preferably with an accuracy greater than the inter frame time of the camera or cameras. The master camera 15 can generate a hardware synchronisation signal that travels along the standard bandwidth second channel 24, which connects cameras 15, 52. The hardware synchronisation signal can ensure that camera shutters are synchronised. The camera shutters may be physical shutters or electronic shutters. Synchronised camera shutters ensure that the two cameras 15, 52 start capturing an image/frame at substantially the same time, such that any differences in the two images/frames is due to camera position, and not due to movement of the platform, or movement of the subject of the images/frames. Moreover, the hardware synchronisation signal can be used to synchronise exposure timing differences. Synchronised images/frames can lead to more accurate stereoscopic photogrammetry for live processing, in addition to offline processing. Using the Network Time Protocol (NTP) for example, one data processor can keep other processors in synchronisation to a tolerance below individual camera frame times.

Images and/or frames captured from a synchronised camera shutter can also include metadata describing the internal timestamp of the camera 15, 52, such that precise synchronisation can be confirmed and unmatched images and/or frames can be ignored. Thus, if images arrive at their destination data processor (not necessarily the closest processor) out of sequence order then they can be reordered into the correct sequence.

In other embodiments, post processing can be used to correct and use images/frames from unsynchronised cameras. Unsynchronised cameras do not require the standard bandwidth second channels 22, 24, 64.

The data processors 17, 54 can also or alternatively be arranged to be globally synchronised, such that their internal chronometers (not shown) reference the same base time.

The inventors have also found that multiple data processors 17, 54 in a single system can give rise to efficient distribution of video and/or image processing. In video and/or image processing systems there are usually a number of operations that need to be performed per frame and/or per image such as filtering and contrast equalisation. Similarly, computer vision systems perform operations such as feature detection, rectification, geometric distortion removal, etc., which are often performed per frame and/or per image. Therefore, each data processor 17, 54 can perform tasks/processes (mentioned above) on the frames and/or images produced by its respective camera 15, 52, thus improving processing efficiency. In comparison to a single, more powerful data processor in a single casing, two data processors 17, 54 in two separate tubular casings 11, 66 can produce less heat per casing. Thus, two casings with two data processors 17, 54 can allow for a simpler/easier cooling system.

A slave data processor e.g. 54 can perform tasks delegated to it by the master data processor 17, such as matching features or compressing and storing views from cameras 15, 52 of the stereoscopic video or images.

The data processors 17, 54 in the illustrated embodiment can be configured to collaboratively work on single images, calculate rectified views, compute pixel disparities, render novel 3D views, generate 3D point clouds, compress stereoscopic video and/or images, or any mixture of the above tasks as is afforded by the design of the system.

Processed data from the data processors 17, 54 can also be output via the third channel 28 of the external data link to an external computer client 29. Each data processor 17, 54 can be connected to an external computer client (e.g. 29, other clients not shown) to perform additional processing or consume data.

A further benefit of camera modules of any embodiment is that having hardware-identical camera modules (e.g. 10) makes production cheaper and easier. Moreover, faulty camera modules (e.g. 10) are simpler to replace: a faulty camera module (e.g. 10) can replace any other camera module (e.g. 30) by changing the software and/or firmware configuration. Additionally, it is not necessary to open a sealed enclosure to make changes to the configuration of a camera module where a different system configuration is desired.

Figure 3:
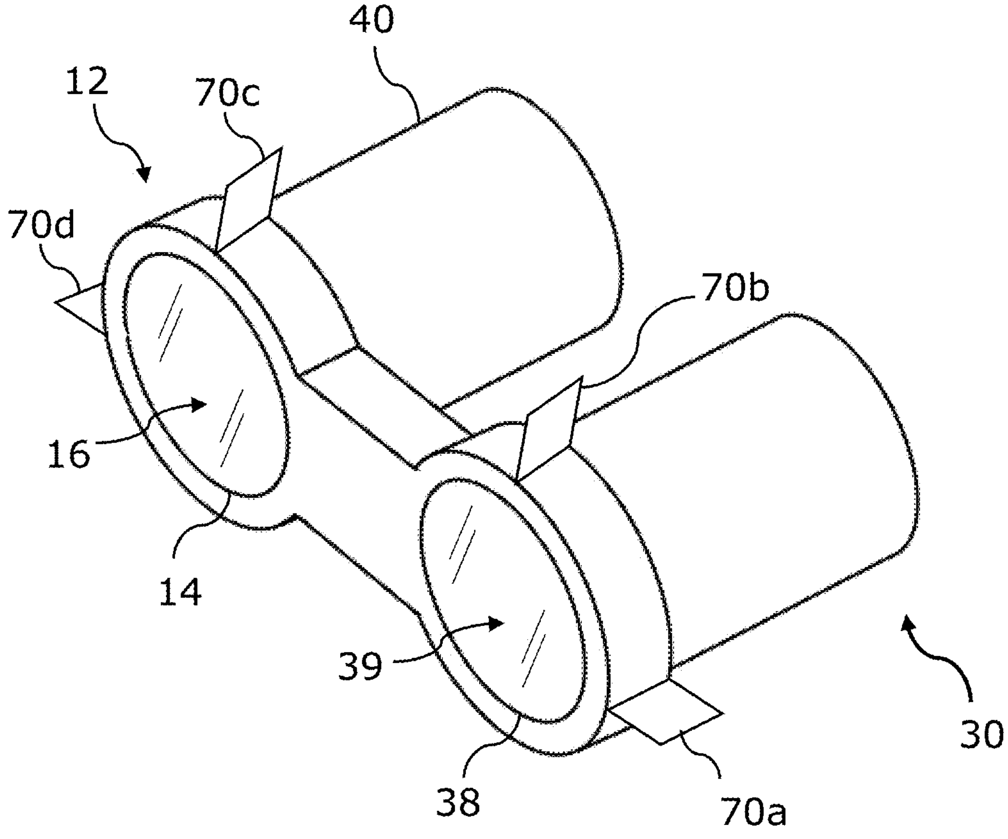
FIG. 3 is an isometric view of a camera mounting endcap.

FIG. 3 shows the camera mounting endcap 40. The camera mounting endcap 40 is arranged to be coupled to the body 32 to seal the first front aperture and the second front aperture, for example via an o-ring sealed flange. The camera mounting endcap 40 comprises a first camera mounting formation for coupling a first camera 15 to the camera mounting endcap 40. The first camera mounting formation may be any means for coupling the camera to the camera mounting endcap 40 such that the camera is fixed (i.e., rigidly maintained) relative to the camera mounting endcap 40 and the first tubular casing 11.

The camera mounting endcap 40 comprises a first viewing port 14 for enabling the first camera 17 to view the harsh environment through the first front aperture of the first tubular casing 11 (and therefore through the camera mounting endcap 40).

The camera mounting endcap 40 comprises a second camera mounting formation for coupling a second camera 52 to the camera mounting endcap 40. The second camera mounting formation may be any means for coupling the camera to the camera mounting endcap 40 such that the camera is fixed (i.e., rigidly maintained) relative to the camera mounting endcap 40 (and the first tubular casing 11). The second camera mounting formation may be the same as the first camera mounting formation or different. The first and second camera mounting formation being arranged to rigidly maintain the first and second cameras in a parallel, side by side relationship. The first and/or second camera mounting formation may include at least one of: ribs or other mounting structures to which a camera can be mounted to the camera mounting endcap 40; or, the cameras are directly attached to the endcap 40 so that it keeps their relative position rigid and works as a heatsink for them.

The camera mounting endcap 40 comprises a second viewing port 38 for enabling the second camera 52 to view the harsh environment through the second front aperture of the second tubular casing 66 (and therefore through the camera mounting endcap 40).

The camera mounting endcap 40 may be configured to receive a material of the viewing port 14, 38 in respective first and second front apertures. The material of the viewing port may be a glass (such as, borosilicate glass, low iron glass, and Corning® Gorilla® Glass), sapphire glass/crystal (e.g., sapphire quartz glass, and quartz fused silica glass), diamond (e.g., formed from Chemical vapour deposition), Germanium, a plastic material (such as acrylic).

The material of the viewing port 14 may be a respective optical assembly of a camera 15, 52. For example, the camera mounting endcap 40 may configured to support at least the weight of the optical assembly of the first and second cameras 15, 52. The camera mounting endcap 40 may be arranged to both hold the cameras 15, 52 internally and to have external surface area therefore acting as a heatsink to transfer heat outside of the camera mounting endcap 40. A single unit of the camera mounting assembly 40 and the optical assemblies allows for modularised assembly and testing. The modular design of the camera mounting endcap 40 makes it easy to transfer the optical assembly to other enclosures, for example camera systems designed for different environments.

The camera mounting endcap 40 may be integrally formed (i.e., a single piece monolithic sub assembly). Beneficially, an integrally formed camera mounting endcap 40 further resists twisting of the camera system 100 when operating in high pressure and/or temperature environments, or when external forces are acting. Alternatively, the camera mounting endcap 40 may be formed from interlocking left and right parts. The camera mounting endcap 40 may be formed from high strength aluminium alloy.

The camera mounting endcap 40 may further comprise radiator fins 70*a*, 70*b*, 70*c*, 70*d* (or other patterned design) on its external surface as shown in FIG. 3. Beneficially, these radiator fins (or other patterned design) may increase the cooling performance of the camera system 100. Internally, the camera 17, 52 of a respective tubular casing 11, 66 forms a barrier between the front and the rear of the tubular casing 11, 66 affording some protection to the optical assembly from processor 17, 54 generated heat.

The camera mounting endcap 40 may include one or more integrated cable holes configured to house the external data link. The integrated cable holes may be configured to house only the standard bandwidth second channel 24 to provide camera synchronisation and/or power. Beneficially, this enables the integrated cable to be sealed between the two interior spaces 16, 39 without passing through the external environment and removes the need for specialised external data ports since the internal pressure of each interior spaces 16, 39 is the same.

The camera mounting endcap 40 can include mounting points for attaching sensors that need to be as close as possible to the cameras 15, 52.

Figure 4:
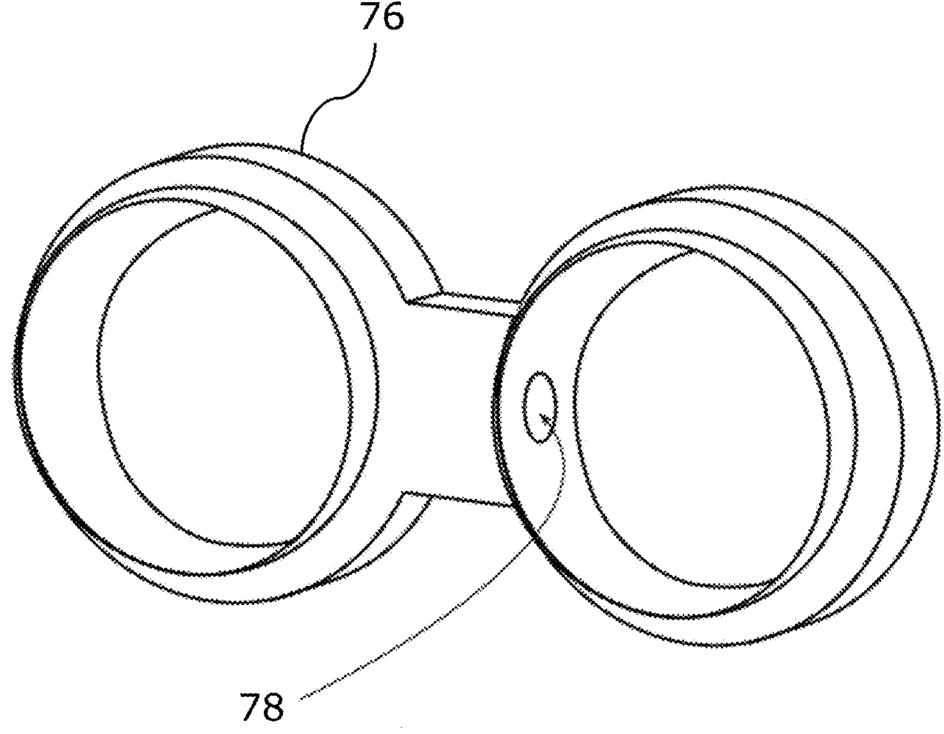
FIG. 4 is an isometric view of a stabilising endcap.

FIG. 4 shows the stabilising endcap 76 which may be arranged to couple to the rear end 13, 33 of the first and second tubular casings 11, 66, for example, if the rear end 13, 33 of the tubular casing 11, 66 define a rear aperture for providing access to the interior space 16, 39. Alternatively, the rear end 13, 33 is formed integrally with the tubular casing 11, 33 and thus the camera system may not comprise the stabilising endcap 76. The stabilising endcap 76 beneficially further avoids twisting of the tubular casings 11, 33 to maintain parallel alignment of the cameras 15, 52 in response to high pressures and temperatures. The stabilising endcap 76 may be formed from high strength aluminium alloy.

The stabilising endcap 76 may be arranged to be coupled to the body 32 to seal the rear apertures of the first and second tubular casings 11, 66.

The stabilising endcap 76 may comprise a first processor mounting formation for coupling a first processor 17 to the stabilising endcap 76. The first processor mounting formation may be any means for coupling the processor 17 to the stabilising endcap 76 such that the processor may be fixed (i.e., rigidly maintained) relative to the stabilising endcap 76 and the first tubular casing 11. The stabilising endcap 76 may comprise a first processor mounting formation for coupling a second processor 54 to the stabilising endcap 76. The second processor mounting formation may be any means for coupling the processor 54 to the stabilising endcap 76 such that the processor 54 may be fixed (i.e., rigidly maintained) relative to the stabilising endcap 76 and the second tubular casing 33. For example, the first processor mounting formation may be an internal clip, mounting structure, or suitable adhesive, etc., Beneficially, the stabilising endcap 76 being coupled to the processor 17, 54 allows for modularised assembly and testing.

The stabilising endcap 76 may be integrally formed. Beneficially, an integrally formed stabilising endcap 76 further resists twisting of the camera system 100 when operating in high pressure and/or temperature environments, or when external forces are acting. Alternatively, the stabilising endcap 76 may be formed from interlocking left and right parts.

The stabilising endcap 76 may further comprise radiator fins (or other patterned design) on its external surface similar to the fins 70*a*, 70*b*, 70*c*, 70*d* of the camera mounting endcap 40 as shown in FIG. 3. Beneficially, these fins (or other patterned design) may increase the cooling performance of the camera system 100.

The stabilising endcap 76 may include one or more integrated cable holes 78 configured to house the external data link, as shown in FIG. 4. Beneficially, this enables the integrated cable to be sealed between the two interior spaces 16, 39 without passing through the external environment and removes the need for specialised external data ports since the internal pressure of each interior spaces 16, 39 is the same. The integrated cable (20, 24) is easy to seal between the two environments (i.e., the interior spaces 16, 39) as the internal pressure of each environment is low. Communication between the data processors 17, 54 can be by optical fibre, copper twisted pair, a combination of both, etc. The integrated cable hole(s) 78 may be configured to house only the high bandwidth first channel 20 to enable sharing of images or video frames and other processed data and/or power between the data processors 17, 54.

The stabilising endcap 76 may comprise one or more connection ports (e.g., P1-P5) for communications and/or power. Advantageously, providing the connection ports in the stabilising endcap 76 enables the tubular casings 11, 66 to be free from ports which may improve the pressure handling capability of the tubular casings 11, 66.

Figure 5:
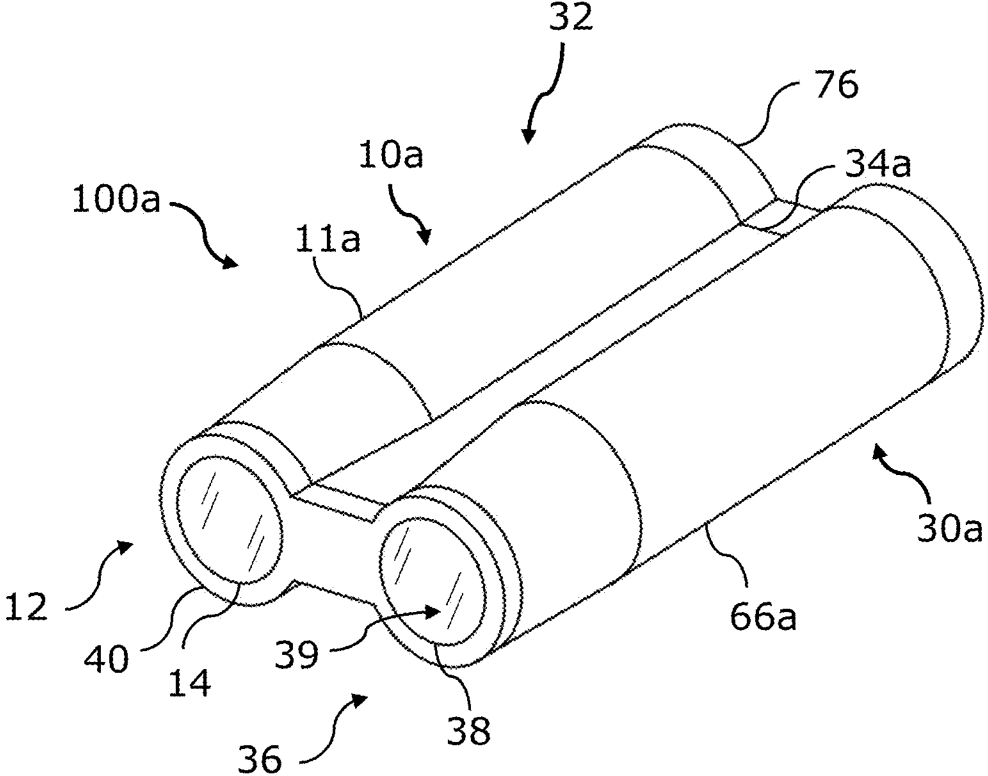
FIG. 5 is an isometric view of a camera system according to an embodiment of the invention, formed from two camera modules.

FIG. 5 shows an alternative camera system 100*a* according to an embodiment of the invention which may be suitable for operating in harsh environments. The alternative camera system 100*a* may comprise all of the features of the camera system 100 as shown in FIGS. 1*a*-1*c*, 2, 3, and 4, in addition to optional features. The same reference numerals are used to denote the same/corresponding features in relation to at least FIG. 1*c* and will not be described again below.

The alternative camera system 100*a* differs from the camera system 100 in that the first and second tubular casings 11*a*, 66*a* are tapered towards the front end 12, 36 of the first and second tubular casings 11*a*, 66*a*. The first and second tubular casings 11*a*, 66*a* may be tapered such that the distance between the centre of the first and second viewing ports 14, 38 is arranged to be a predetermined stereo baseline between the first and second cameras 15, 52. Advantageously, the tapered first and second tubular casings 11*a*, 66*a* enable support of a range of stereo baselines. The stereo baseline (i.e., the distance between both cameras 15, 52) will influence the camera depth/range that you can observe with a stereo camera, and also your depth/range resolution. The stereo baseline will also influence the focal length of the optical assembly used with the cameras 15, 52. Without tapering, the stereo baseline would be dictated by the size of the longitudinal strut 34, first and second tubular casings 11, 66, and/or the first and second data processors 17, 54. Advantageously tapering of the first and second tubular casings 11*a*, 66*a* may also reduce the weight of the system 100 and increase enclosure strength when under high pressure (such as those experienced in subsea environments). In addition, tapering of the first and second tubular casings 11*a*, 66*a* may allow reduced viewing port area (in comparison to the example of FIG. 1*a*-1*c*) which may allow for a reduced thickness of the viewing port 14, 38 because larger viewing ports are required to be thicker when rated for the same pressure.

Figure 6:
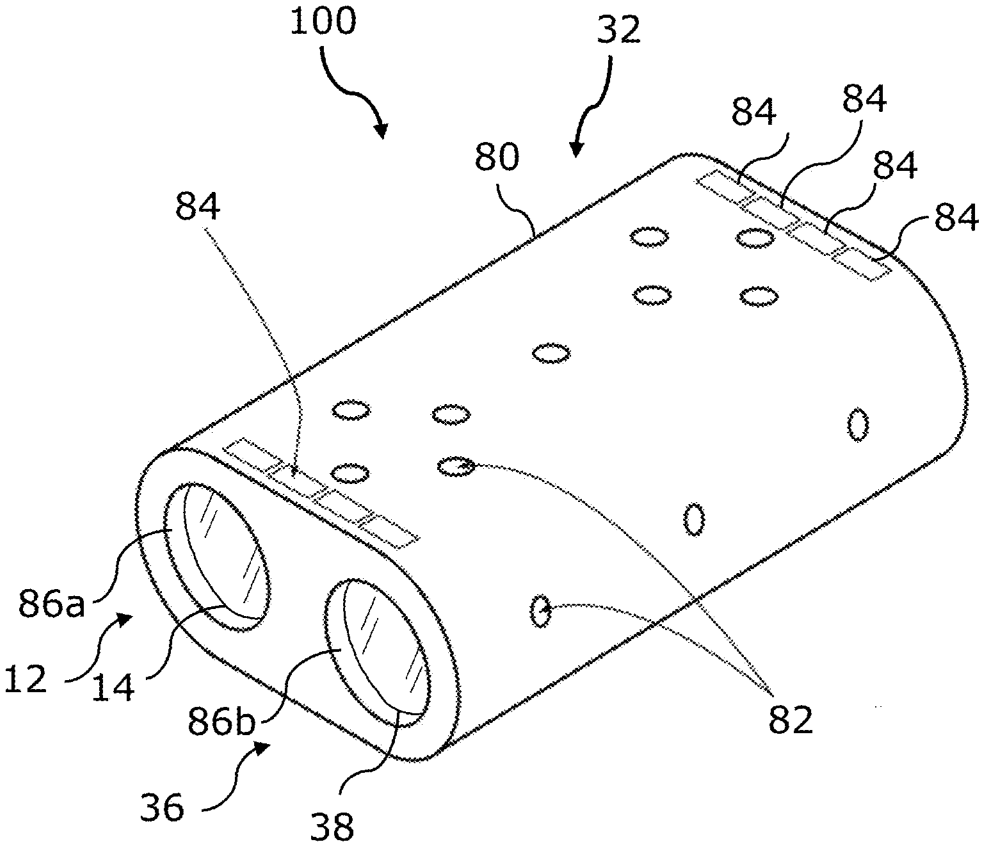
FIG. 6 is an isometric view of a camera system covered in an enclosure cover system according to an embodiment of the invention, formed from two camera modules.

FIG. 6 shows a camera system according to an embodiment of the invention further comprising an enclosure cover system 80 arranged to cover the body 32. The enclosure cover system 80 comprises one or more mounting points 82 for coupling the enclosure cover system 80 to a platform, such as a ROV. Advantageously, the mounting points 82 are separate from the body 32 such that mechanical stresses at the mounting points 82 are transferred to the enclosure cover system 80 such that the elements of the body 32 (e.g., the first tubular casing 11, the second tubular casing 66, and the longitudinal strut 34) move together. Therefore, the body 32 may avoid mechanical stresses which may result in misalignment of the cameras 15, 52. Moreover, the mounting points 82 facilitating easier mounting of the camera system on different platforms. The mounting points 82 may be suitable for coupling to a platform via any mechanical means such as, through-bolts, threaded components, quick release mechanism, etc. The mounting points 82 may also be suitable for coupling to a robotic manipulator arm, or for attaching other sensors, cable guides, tethers, buoyancy foam for balancing/tuning the ROV (e.g., it is desirable for a ROV/AUV to sit in the water in an upright position by itself and be slightly positively buoyant, so it floats to the surface if it ever got cut from a tether).

The enclosure cover system 80 provides a protective cover to the body 32 and may reduce the possibility of accidental damage causing corrosion to the parts of the body 32.

The enclosure cover system 80 may further comprise one or more ventilation slots 84. Advantageously, ventilation slots 84 allow heat to transfer into the external environment and keep the body 32 to a suitable operating temperature. The ventilation slots 84 may be of any suitable size.

The enclosure cover system may further comprise one or more lens hoods 86*a*, 86*b* for the first viewing port 14 and/or the second viewing port 38. Advantageously, the lens hoods 86*a*, 86*b* may reduce the amount of stray light entering the optical system of each camera 15, 52 and may reduce the resultant image contrast. Alternatively, a single lens hood may cover both viewing ports 14, 38. The lens hoods 86*a*, 86*b* may cover the entire periphery of respective viewing ports 14, 38 (as shown in FIG. 6), or only part of respective viewing port 14, 38 (e.g., 180°, 120°, etc.). The lens hoods 86*a*, 86*b* may be matched to the lens used on the camera such as camera 15, 52.

The first internal space 16 may be defined as the space available inside the first tubular casing 11, i.e., any space inside the pressure vessel (e.g., the pressure vessel may be defined by first tubular casing 11, camera mounting endcap 40, and the stabilising endcap 76).

The camera systems shown in FIGS. 1*a* to 6, may comprise a third tubular casing coupled to the first and/or second tubular casings 11, 66, 11*a*, 66*a* via one or more longitudinal struts similar to longitudinal strut 34. Such a multi camera system may comprise three camera modules arranged in a trinocular configuration. This system may have all the benefits of the previous embodiments. In practice, multi camera system can work with any number of camera modules. Additional camera modules can be connected to the system by the external data link channels (e.g. 18, 22, 20, 24, 60, and 64).

Extending the previous embodiments to a trinocular configuration or a system with more cameras (not shown) only requires a different platform (not shown) and/or changing the software and/or firmware configuration, since all camera modules may be arranged to be identical in hardware; i.e. the third camera module may have a camera which is of the same type as the cameras 15 and 52, and the third camera module may have a data processor which is of the same type as the data processors 17 and 54. The third module may comprise multiple stereo camera pairs or be a tubular casing for lighting, additional compute modules, other sensors and so on.

The platform (not shown) can be arranged to maintain each camera module at a constant distance d from each adjacent camera module in converging, overlapped or other configuration. In other embodiments the camera modules can be arranged by the platform to be spaced equally along a straight line of length (x−1)*d (where x is the number of camera modules in the system). In other embodiments the camera modules can be arranged by the platform to be different distances away from each other in either a 2D plane or a 3D plane. In some or all of these embodiments the camera module can be arranged such that there can be an overlap in some or all of the cameras' fields of view (an overlapping field of view is desirable for stereoscopic photogrammetry).

FIG. 5 shows that the first and second tubular casings 11*a*, 66*a* may be tapered towards the first end. Alternatively, the first and second tubular casings 11, 33 of FIG. 1*c* may be used in combination with a camera mounting endcap which is tapered to achieve the same effect. That is, a tapered camera mounting endcap may allow the body 32 to comprise tubular casings 11, 33 which are regular cylinders joined together via the longitudinal strut 34. In addition, the camera mounting endcap may have increased external surface area to help dissipate heat from the cameras 15, 52 into the outside environment. This option would reduce the overall rigidity of the system 100*a*.

A camera system may be formed from the first tubular casing 11 of FIG. 1*c* and the second tubular casing 66*a* of FIG. 5 via the longitudinal strut 34 (which may be adapted to suitably coupled the first and second tubular casings, e.g., 11, 66*a*). This arrangement may still benefit from some or all of the advantages associated with FIG. 5 as will be apparent to the person skilled in the art.

The multicamera system may enable omnidirectional video, panoramic wide-angle content, or multiple angles of a live event e.g. sports, a music concert, rocket launch, etc. where frame accurate syncing is required, such as photo finish timing, multiple view geometry reconstruction, video editing or evidential image gathering. A multicamera system such as with many cameras also enables omnidirectional video as required for the perception system of an autonomous vehicle for harsh environments, where expanded perception is preferable to requiring platform motion to capture different views.

It should be noted that the above-mentioned embodiments illustrate rather than limit the invention, and that those skilled in the art will be capable of designing many alternative embodiments without departing from the scope of the invention as defined by the appended claims.

The invention claimed is:

1. A camera system for imaging in harsh environments, the camera system comprising:
- a body, the body comprising:
  - a first tubular casing defining front and rear ends, the front end of the first tubular casing defining a first front aperture for providing access to a first interior space;
  - a second tubular casing defining front and rear ends, the front end of the second tubular casing defining a second front aperture for providing access to a second interior space; and
  - a longitudinal strut which couples the first tubular casing to the second tubular casing to rigidly maintain the first and second tubular casings in a parallel, side by side relationship;
- a camera mounting endcap arranged to be coupled to the body to seal the first front aperture and the second front aperture, the camera mounting endcap comprising:
  - a first camera mounting formation for coupling a first camera to the camera mounting endcap;
  - a first viewing port for enabling the first camera to view the harsh environment through the first front aperture; and
  - a second camera mounting formation for coupling a second camera to the camera mounting endcap; and
- a second viewing port for enabling the second camera to view the harsh environment through the second front aperture, wherein the first and second camera mounting formation being arranged to rigidly maintain the first and second cameras in a parallel, side by side relationship.

2. The camera system of claim 1, wherein the camera system further comprises:
- a first camera mounted within the first interior space;
- a first data processor mounted within the first interior space;
- a first internal data link coupled between the first camera and the first data processor within the first interior space to transfer image data from the first camera to the first data processor;
- a second camera mounted within the second interior space;
- a second data processor mounted within the second interior space;
- a second internal data link coupled between the second camera and the second data processor within the second interior space to transfer image data from the second camera to the second data processor; and
- an external data link arranged to communicatively couple the first camera and/or the first data processor to the second camera and/or the second data processor, the external data link spanning between the first tubular casing and the second tubular casing.

3. The camera system of claim 1, wherein the rear end of the first tubular casing defining a first rear aperture for providing access to the first interior space;
- wherein the rear end of the second tubular casing defining a second rear aperture for providing access to the second interior space; and
- wherein the camera system further comprises a stabilising endcap arranged to be coupled to the body to seal the first rear aperture and the second rear aperture.

4. The camera system of claim 3, wherein the stabilising endcap includes one or more integrated cable holes configured to house the external data link.

5. The camera system of claim 3, wherein the stabilising endcap is integrally formed.

6. The camera system of claim 3, wherein the stabilising endcap further comprises fins on its external surface.

7. The camera system of claim 1, wherein the camera mounting endcap includes one or more integrated cable holes configured to house the external data link.

8. The camera system of claim 1, wherein the first and second tubular casings are tapered towards the first end.

9. The camera system of claim 8, wherein the first and second tubular casings are tapered towards the first end such that the distance between the centre of the first and second viewing ports is arranged to be a predetermined stereo baseline between the first and second cameras.

10. The camera system of claim 1, wherein the first tubular casing, second tubular casing and strut are integrally formed.

11. The camera system of claim 1, wherein the camera mounting endcap is configured to receive a material of the viewing port in respective first and second front apertures, and the camera mounting endcap is integrally formed.

12. The camera system of claim 1, wherein the camera mounting endcap is configured to support the weight of an optical assembly of the first and second cameras.

13. The camera system of claim 1, wherein the camera system further comprises:
- an enclosure cover system arranged to cover the body, wherein the enclosure cover system comprises mounting points for coupling the enclosure cover system to a platform.

14. The camera system of claim 13, wherein the enclosure cover system further comprises ventilation slots.

15. The camera system of claim 13, wherein the enclosure cover system further comprises one or more lens hoods for the first viewing port and/or the second viewing port.

16. The camera system of claim 13, wherein the platform comprises a vehicle.

17. The camera system of claim 1, further comprising the first camera and the second camera.

* * * * *